United States Patent [19]
Seki et al.

[11] Patent Number: 5,060,604
[45] Date of Patent: Oct. 29, 1991

[54] METHOD OF DETECTING FAILURE OF A VALVE TIMING CHANGEOVER CONTROL SYSTEM OF AN INTERNAL COMBUSTION ENGINE

[75] Inventors: Yasunari Seki; Yosuke Tachibana, both of Wako, Japan

[73] Assignee: Honda Giken Kogyo Kabushiki Kaisha, Tokyo, Japan

[21] Appl. No.: 536,745

[22] Filed: Jun. 12, 1990

[30] Foreign Application Priority Data

Jun. 15, 1989 [JP] Japan .................................. 1-152847

[51] Int. Cl.$^5$ .............................................. F01L 1/34
[52] U.S. Cl. ............................ 123/90.16; 123/90.15; 123/489
[58] Field of Search ............... 123/90.15, 90.16, 90.17, 123/489

[56] References Cited

U.S. PATENT DOCUMENTS

| 4,917,057 | 4/1990 | Seki | 123/90.16 |
| 4,960,083 | 10/1990 | Seki et al. | 123/90.16 |
| 4,960,094 | 10/1990 | Keike et al. | 123/90.16 |
| 4,960,095 | 10/1990 | Koike et al. | 123/90.16 |
| 4,996,954 | 3/1991 | Seki et al. | 123/90.16 |

FOREIGN PATENT DOCUMENTS

49-33289 9/1974 Japan .
2102310 4/1990 Japan .

Primary Examiner—Willis R. Wolfe
Assistant Examiner—Weilun Lo
Attorney, Agent, or Firm—Lyon & Lyon

[57] ABSTRACT

Failure of a valve timing changeover control system of an internal combustion engine is detected by comparing a present value of an air-fuel ratio feedback control correction coefficient which is varied in response to output from an O$_2$ sensor with a predetermined value of the correction coefficient obtained based on values of same obtained during the feedback control of the air-fuel ratio. Alternatively, or in combination, failure of the valve timing changeover control system is detected by determining whether a present value of the correction coefficient obtained with respect to each of a plurality of cylinders of the engine in response to output from each of O$_2$ sensors corresponding to the each cylinder is outside a predetermined range of deviation of values of the correction coefficient from a reference value, the deviation resulting from differences in characteristics between the cylinders.

12 Claims, 7 Drawing Sheets

METHOD OF DETECTING FAILURE OF A VALVE TIMING CHANGEOVER CONTROL SYSTEM OF AN INTERNAL COMBUSTION ENGINE

BACKGROUND OF THE INVENTION

This invention relates to a method of detecting failure of a valve timing changeover control system of an internal combustion engine, which changes the valve timing of inlet and/or exhaust valves.

It is conventionally known e.g. from Japanese Patent Publication (Kokoku) No. 49-33289 to provide a valve timing changeover mechanism which changes the valve timing of inlet and exhaust valves of an internal combustion engine, in response to an instruction signal from a control unit depending on operating conditions of the engine. Throughout the specification and claims, the term "the changeover of valve timing" means changeover of a valve lift amount and/or at least one of the valve opening period and the valve opening angle. Further, "the changeover of valve timing" includes inhibiting the operation of one of a plurality of inlet or exhaust valves provided for each cylinder of the engine in a specific operating region of the engine.

In such an engine capable of changing the valve timing, if the valve timing changeover mechanism becomes faulty, there can be a case in which even if the control unit outputs an instruction signal for changeover of the valve timing, the valve timing is not actually changed in spite of the instruction signal. In such a case, other controls (fuel supply control, ignition timing control, etc.) which are carried out in accordance with the valve timing controlled in response to the instruction signal are not carried out in manners suitable for the actually selected valve timing, which results in degraded performance of the engine such as degraded driveability. In order to solve this problem, a failure-detecting device for detecting failure of a valve timing changeover mechanism has already been proposed in Japanese Provisional Patent Publication (Kokai) No. 2-102310 by the present assignee.

The proposed failure-detecting device is adapted to detect failure of a valve timing changeover mechanism which comprises first and second cams having profiles different from each other, and first and second rocker arms on which the first and second cams slide, respectively. The cams for driving inlet and exhaust valves are changed over between the first and the second cams to thereby change the valve timing between low speed valve timing suitable for a lower engine rotational speed range and high speed valve timing suitable for a higher engine rotational speed range. The proposed failure-detecting device is based upon the fact that if the valve timing is actually changed in response to the instruction signal from the control unit, the states of contact between the first and second cams and the respective first and second rocker arms are changed. Therefore, a value of electric resistance between the rocker arms and a camshaft on which the cams are integrally formed is detected, and based on the detected electric resistance value and the instruction signal, it is detected whether there is failure in the valve timing changeover mechanism.

However, the proposed failure-detecting device requires application of a voltage between the cam shaft and the rocker arms in order to detect the electric resistance value therebetween, so that it is necessary to electrically insulate the camshaft and rocker arms from the cylinder block of the engine, which results in a more complicated structure of the engine. Further, the cam and rocker arms have to be formed of materials having higher electric resistance, which brings about the problems of the effective lives of the component parts and the manufacturing cost thereof.

SUMMARY OF THE INVENTION

It is the object of the invention to provide a method of detecting failure of a valve timing changeover control system of an internal combustion engine, which is capable of positively detecting failure of the system in a simple manner by the use of values of coefficients dependent on output from an exhaust gas ingredient concentration sensor used for air-fuel ratio feedback control.

To attain the above object, according to a first aspect of the invention, there is provided a method of detecting failure of a valve timing changeover control system of an internal combustion engine having at least one inlet valve, at least one exhaust valve, an exhaust system, at least one exhaust gas ingredient concentration sensor arranged in the exhaust system for detecting the concentration of an exhaust gas ingredient, and control means for controlling the air-fuel ratio of an air-fuel mixture supplied to the engine to a desired value in a feedback manner by the use of a coefficient which is varied in response to output from the exhaust gas ingredient concentration sensor, the valve timing changeover control system changing the valve timing of at least one of the at least one inlet valve and the at least one exhaust valve depending on operating conditions of the engine.

The method is characterized by comprising the steps of:

(1) obtaining a predetermined value of the coefficient based on values of the coefficient obtained during the control of the air-fuel ratio in the feedback manner;
(2) comparing a present value of the coefficient with the obtained predetermined value; and
(3) detecting whether there is failure in the valve timing changeover control system, from the result of the comparison.

Preferably, it is determined that there is failure in the valve timing changeover control system when a difference between the present value of the coefficient and the obtained predetermined value is larger than a predetermined value.

More preferably, it is determined that there is failure in the valve timing changeover control system when a difference between the present value and the obtained predetermined value has continued to be larger than a predetermined value over a predetermined time period.

Further preferably, the obtained predetermined value of the coefficient is an average value of the values of the coefficient obtained during the control of the air-fuel ratio in the feedback manner.

According to a preferred form of the first aspect of the invention, there is provided a method of detecting failure of a valve timing changeover control system of an internal combustion engine having at least one inlet valve, at least one exhaust valve, an exhaust system, at least one exhaust gas ingredient concentration sensor arranged in the exhaust system for detecting the concentration of an exhaust gas ingredient, and control means for controlling the air-fuel ratio of an air-fuel mixture supplied to the engine to a desired value in a feedback manner by the use of a coefficient which is varied in response to output from the exhaust gas ingredient concentration sensor, the valve timing changeover control system changing the valve timing of at least one of the at least one inlet valve and the at least one exhaust valve depending on operating conditions of the engine, a first learned value being calculated based on values of the coefficient obtained during the control of the air-fuel ratio in the feedback manner, the first learned value being used as an initial value of the coefficient when the control of the air-fuel ratio in the feedback manner is started.

The method according to this form of the first aspect of the invention is characterized by comprising the steps of:
(1) calculating a second learned value based on values of the coefficient obtained during the control of the air-fuel ratio in the feedback manner at a calculation speed different from a calculation speed used for calculation of the first learned value;
(2) determining a difference between the calculated second learned value and a present value of the coefficient; and
(3) detecting whether there is failure in the valve timing changeover control system, from the determined difference.

Preferably, the calculation speed of the second learned value is slower than the calculation speed of the first learned value.

According to a second aspect of the invention, there is provided a method of detecting failure of a valve timing changeover control system of an internal combustion engine having a plurality of inlet valves, a plurality of exhaust valves, a plurality of cylinders, an exhaust system, a plurality of exhaust gas ingredient concentration sensors arranged in the exhaust system for respective ones of the cylinders for detecting a concentration of an exhaust gas ingredient for each of the cylinders, and control means for controlling the air-fuel ratio of an air-fuel mixture supplied to each of the cylinders to a desired value in a feedback manner by the use of a coefficient which is varied in response to output from each of the exhaust gas ingredient concentration sensors, the valve timing changeover control system changing the valve timing of at least one of the inlet valves and the exhaust valves depending on operating conditions of the engine.

The method according to the second aspect of the invention is characterized by comprising the steps of:
(1) determining whether a present value of the coefficient obtained with respect to the each of the cylinders in response to output from each of the exhaust gas ingredient concentration sensors corresponding to the each of the cylinders is outside a predetermined range of deviation of values of the coefficient from a reference value, the deviation resulting from differences in characteristics between the cylinders; and
(2) determining that there is failure in a part of the valve timing changeover control system corresponding to the each of the cylinders when the present value of the coefficient is outside the predetermined range of deviation.

Preferably, the reference value is an average value of values of the coefficient obtained with respect to respective ones of the cylinders.

More preferably, it is determined that there is failure in the part of the valve timing changeover control system corresponding to the each cylinder when the present value of the coefficient has continued to be outside the predetermined range of deviation over a predetermined time period.

The above and other objects, features, and advantages of the invention will become more apparent from the ensuing detailed description taken in conjunction with the accompanying drawings.

BRIEF DESCRIPTION OF THE DRAWINGS

FIG. 2b is a diagram showing the valve timing changeover control system including the device of FIG. 2a;

DETAILED DESCRIPTION

The method according to the invention will now be described in detail with reference to the drawings showing an embodiment thereof.

Figure 1:
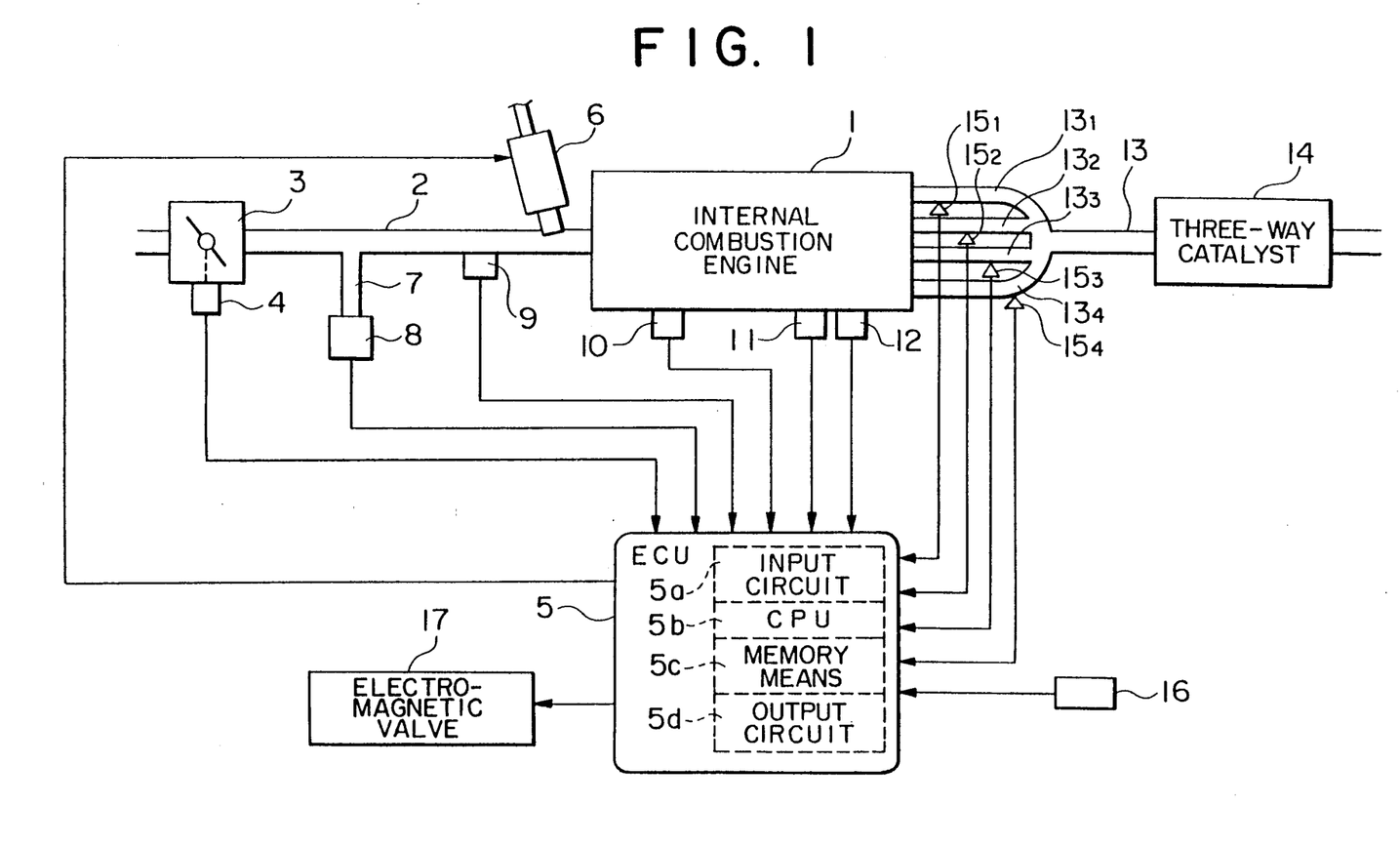
FIG. 1 is a schematic diagram showing the whole arrangement of a fuel supply control system equipped with a valve timing changeover control system to which is applied the method of detecting failure of the valve timing changeover control system according to the invention.

Referring first to FIG. 1, there is shown the whole arrangement of a fuel supply control system equipped with a valve timing changeover control system to which is applied the method according to the invention. In the figure, reference numeral 1 designates an internal combustion engine of 4 cylinder (#1 to #4) type for automotive vehicles, in which two pairs of inlet and exhaust valves are provided for each cylinder. Connected to the cylinder block of the engine 1 is an intake pipe 2 across which is arranged a throttle valve 3. A throttle valve opening ($\theta_{TH}$) sensor 4 is connected to the throttle valve 3 for generating an electric signal indicative of the sensed throttle valve opening and supplying same to an electronic control unit (hereinafter called "the ECU") 5.

Figure 2A:
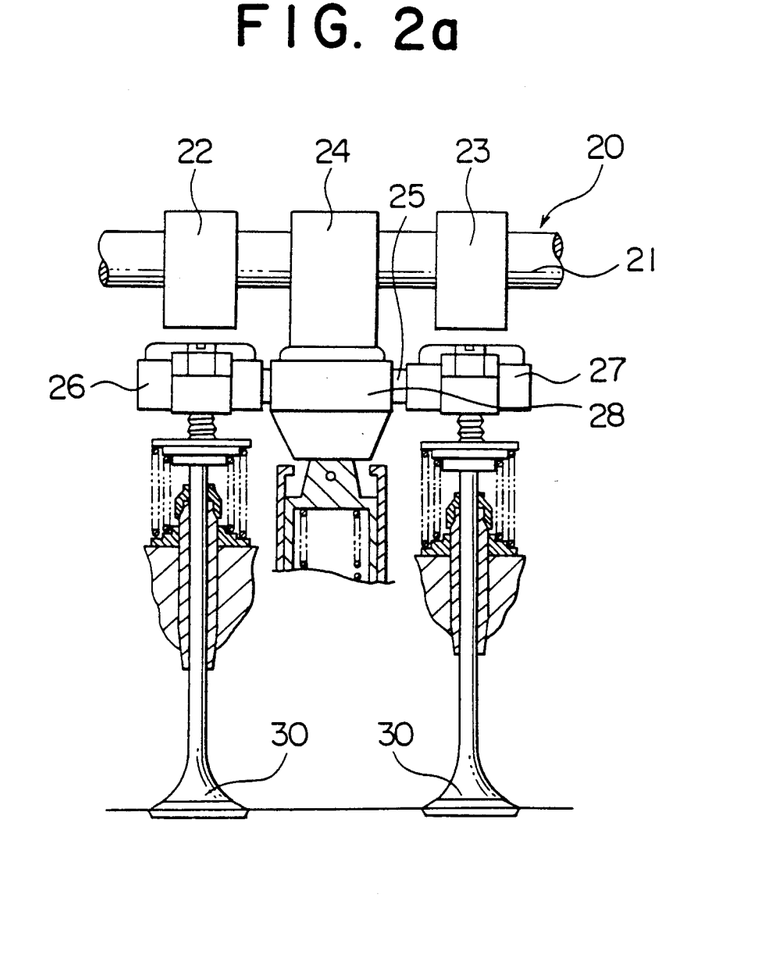
FIG. 2a is a diagram showing an inlet valve-operating device of the engine.
Figure 2B:
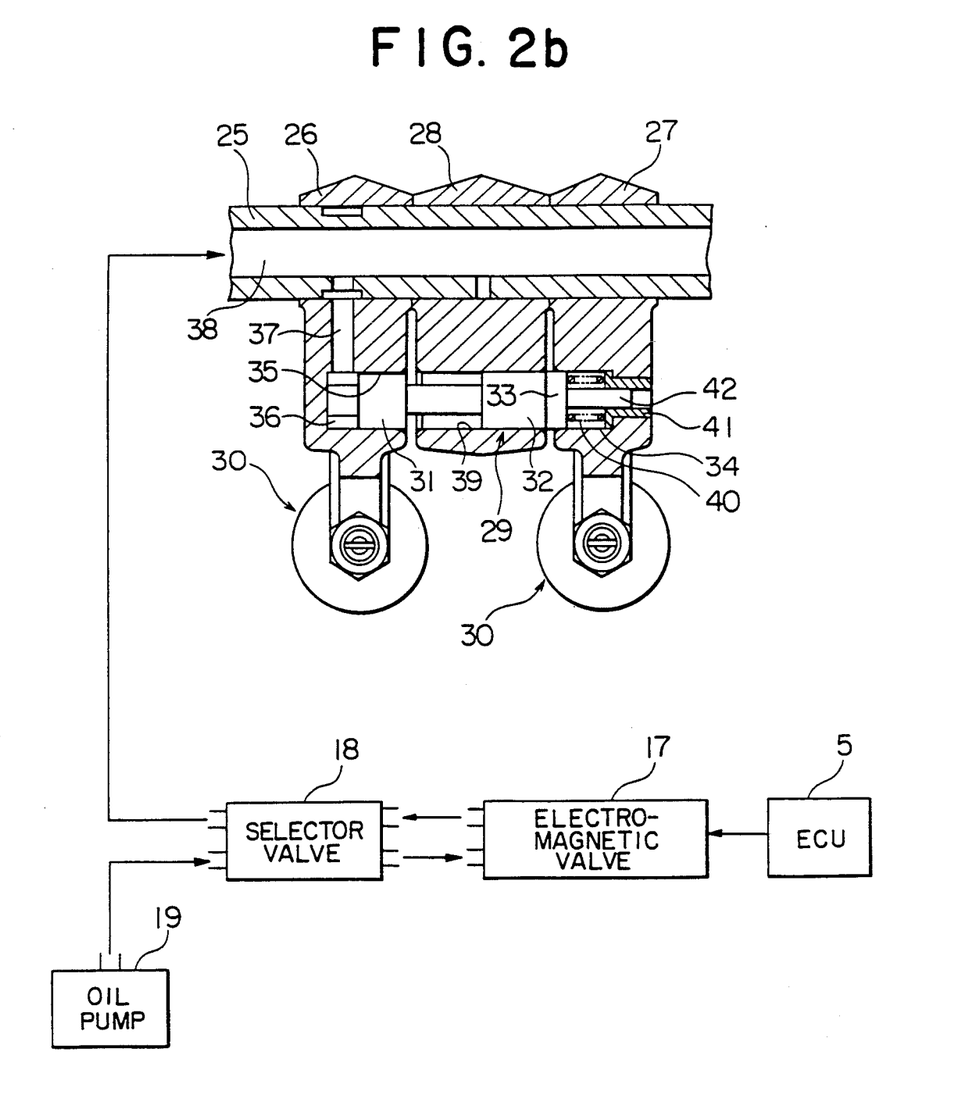

Fuel injection valves 6, only one of which is shown, are inserted into respective branched pipes of an intake manifold of the intake pipe between the cylinder block of the engine 1 and the throttle valve 3, at locations slightly upstream of respective intake valves 30, shown in FIGS. 2a and 2b. The fuel injection valves 6 are connected to a fuel pump, not shown, and electrically connected to the ECU 5 to have their valve opening periods controlled by signals therefrom.

On the other hand, an intake pipe absolute pressure ($P_{BA}$) sensor 8 is provided in communication with the interior of the intake pipe 2 at a location immediately downstream of the throttle valve 3 by way of a conduit 7 for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_W$)sensor 10, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft, not shown, of the engine 1. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

Connected to the cylinders #1 to #4 are respective branched pipes $13_1$ to $13_4$ of an exhaust manifold of an exhaust pipe 13. A three-way catalyst 14 is arranged within the exhaust pipe 13 at a location downstream of the exhaust manifold for purifying noxious components such as HC, CO, and NOx. Four $O_2$ sensors $15_1$ to $15_4$ as exhaust gas ingredient concentration sensors are mounted in the branched pipes of the exhaust manifold, respectively, for each sensing the concentration of oxygen present in exhaust gases emitted from the corresponding cylinder into the corresponding branched pipe of the exhaust manifold and supplying an electric signal indicative of the sensed oxygen concentration to the ECU 5.

Further electrically connected to the ECU 5 are other engine operating condition parameter sensors 16, such as an atmospheric pressure sensor, and signals from these sensors are supplied to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs a driving signal to the fuel injection valves 6.

The CPU 5b operates in response to the above-mentioned mentioned signals from the sensors to determine operating conditions in which the engine 1 is operating, such as an air-fuel ratio feedback control region for controlling the air-fuel ratio in response to oxygen concentration in exhaust gases and open-loop control regions, and calculates, based upon the determined operating conditions, the valve opening period or fuel injection period $T_{OUT}$ over which the fuel injection valves 6 are to be opened, by the use of the following equation in synchronism with inputting of TDC signal pulses to the ECU 5:

$$T_{OUT} = Ti \times K_{O2} \times K_1 + K_2 \quad (1)$$

where Ti represents a basic fuel injection period of the fuel injection valves 6, which is determined based upon the engine rotational speed Ne and the intake pipe absolute pressure $P_{BA}$. $K_{O2}$ is an air-fuel ratio feedback control correction coefficient whose value is determined in response to the oxygen concentration in the exhaust gases during feedback control. While the engine is in specific operating regions other than the feedback control region, an average value $K_{REF}$ (first learned value) of values of the coefficient $K_{O2}$ obtained during the feedback control is used in a manner depending on each of the specific operating regions. Further, the average value $K_{REF}$ is used as an initial value of the coefficient $K_{O2}$ when the engine has shifted from any of the specific operating regions into the feedback control region. $K_1$ and $K_2$ represent other correction coefficients and correction variables, respectively, which are calculated based on various parameters indicative of operating conditions of the engine, such as engine coolant temperature, throttle valve opening, intake air temperature, etc., to such values as to optimize operating characteristics of the engine, such as startability, fuel consumption, and accelerability, depending on operating conditions of the engine.

The ECU 5 supplies each of the fuel injection valves 6 with a driving signal for opening same over the fuel injection period TOUT thus obtained.

FIG. 2a shows an inlet valve-operating device 20 for driving the inlet valves 30 of each cylinder of the engine 1. An exhaust valve-operating device, not shown, basically having the same construction as the device 20 is provided for the exhaust valves. The inlet valve-operating device 20 comprises a camshaft 21 rotatively driven by a crankshaft, not shown, of the engine at a speed ratio of ½ relative to the latter, a high speed cam 24 and low speed cams 22, 23 secured on the camshaft 21, the three cams 22 to 24 being provided for each cylinder, a rocker shaft 25 extending parallel with the camshaft 21, first and second driving rocker arms 26 and 27, and a free rocker arm 28 pivotally mounted on the rocker shaft 25, the three arms 26 to 28 being provided for each cylinder, and a connection-changeover mechanism 29 (valve timing changeover mechanism) arranged in the corresponding rocker arms 26, 27, 28 for each cylinder as shown in FIG. 2b.

FIG. 2b shows a valve timing changeover control system including the device of FIG. 2a. As shown in the figure, the connection-changeover mechanism 29 comprises a first changeover pin 31 capable of connecting the first driving rocker arm 26 with the free rocker arm 28, a second changeover pin 32 capable of connecting the second driving rocker arm 27 with the free rocker arm 28, a restriction pin 33 for restricting the movement of the first and second changeover pins 31, 32, and a return spring 34 urging the pins 31, 32, 33 in the rocker arm-disconnecting direction.

The first driving rocker arm 26 is formed therein with a first guide bore 35 extending parallel with the rocker shaft 25 with one end thereof closed and the other end opening in a side face thereof facing the free rocker arm 28. The first changeover pin 31 is slidably fitted in the first guide bore 35, defining an oil hydraulic chamber 36 between one end thereof and the closed end of the first guide bore 35. Further, a passage 37 extends in the rocker arm 26 and the rocker shaft 25 from the oil hydraulic chamber 36 and opens into an oil feeding passage 38 formed in the rocker shaft 25 so that the oil feeding passage 38 permanently communicates via the passage 37 with the oil hydraulic chamber 36 irrespective of rocking motion of the first driving rocker arm 26.

The free rocker arm 28 is formed therein with a guide through hole 39 at a location corresponding to the first guide bore 35, which extends through the free rocker arm 28 and parallel with the rocker shaft 25. The second changeover pin 32 is slidably fitted in the guide through hole 39, with one end thereof abutting on an opposed end face of the first changeover pin 31.

The second driving rocker arm 27 is formed therein with a second guide bore 40 at a location corresponding to the guide through hole 39, which extends parallel with the rocker shaft 25 with one end thereof opening toward the free rocker arm 28. The restriction pin 33 in the form of a disc is slidably fitted in the second guide bore 40, in a fashion abutting on the other end of the second changeover pin 32. Further, the second guide bore 40 has a guide sleeve 41 fitted therein, in which is slidably fitted an axial rod 42 which coaxially and integrally projects from the restriction pin 33. The return spring 34 is interposed between the guide sleeve 41 and the restriction pin 33 and urges the pins 31, 32, 33 toward the oil hydraulic chamber 36.

In the connection-changeover mechanism 29 constructed as above, when the pressure in the oil hydraulic chamber 36 is increased, the first changeover pin 31 is forced to move into the guide through hole 39 and at the same time the second changeover pin 32 is urgedly moved into the second guide bore 40 to connect the rocker arms 26, 27, 28 together. When the pressure in the oil hydraulic chamber 36 is decreased, the first changeover pin 31 is moved back by the urging force of the spring 34 into a position in which the end face thereof abutting on the second changeover pin 32 corresponds in location to the space between the first driving rocker arm 26 and the free rocker arm 28, and at the same time the second changeover pin 32 is moved back into a position in which the end face thereof abutting on the restriction pin 33 corresponds in location to the space between the free rocker arm 28 and the second driving rocker arm 27, whereby the rocker arms 26, 28, 27 become disconnected from each other.

The oil feeding passage 38 within the rocker shaft 25 is connected to an oil pump 19 via a selector valve 18 which operates to change over the oil pressure within the oil feeding passage 38 and hence the oil pressure within the oil hydraulic chamber 36 of the connection-changeover mechanism 29 between high and low levels. The selector valve 18 is connected to an electromagnetic vale 17, and the ECU controls the changeover operation of the selector valve 18 via the electromagnetic valve 17.

The inlet valve-operating device 20 of the engine 1 constructed as above operates in the following manner (in addition, the exhaust valve-operating device operates similarly):

When the ECU 5 sends out a valve-opening instruction signal to the electromagnetic valve 17 while the engine is in a high speed region, the electromagnetic valve 17 is opened to thereby cause the selector valve 18 to open, so that the oil pressure in the oil feeding passage 38 is increased. This causes the connection-changeover mechanism 29 to operate to connect the rocker arms 26, 27, 28 together, whereby the high speed cam 24 operates the rocker arms 26, 27, 28 in unison. (FIG. 2a shows this state) to cause each pair of inlet valves 35 to open and close at high speed valve timing in which the valve-opening period and the valve lift amount are relatively greater.

On the other hand, when the ECU 5 supplies a valve-closing instruction signal to the electromagnetic valve 17 while the engine is in a low speed region, the electromagnetic valve 17 and in turn the selector valve 18 are closed to thereby decrease the oil pressure in the oil feeding passage 28. This causes the connection-changeover mechanism 29 to operate to disconnect the rocker arms 26, 27, 28 from each other, whereby the low speed cams 22, 23 operate the corresponding rocker arms 26, 27 to cause the pair of inlet valves 30 to open and close at low speed valve timing in which the valve-opening period and the valve lift amount are relatively smaller.

The failure detecting method according to the invention will be described below with reference to FIGS. 3 to 6.

According to the method of the invention, an $O_2$ sensor is provided for each cylinder, and the air-fuel ratio feedback control is carried out for each cylinder independently of the other cylinders. The method of the invention is based on the fact that if valve timing to be controlled by the valve timing changeover control system (hereinafter referred to as "the V/T control system") is held at high speed valve timing due to holding of the changeover pin 31 in the guide through hole 39, which can be caused by lodging of dust or metal powder therebetween, or breakage of wiring between the ECU 5, the electromagnetic valve 17, the selector valve 18, and the connection-changeover mechanism 29, the correction coefficient $K_{O2}$ obtained with respect to the cylinder suffering from the holding of valve timing assumes a value greatly deviated from a normal one to be assumed during low speed valve timing, when the engine is in operating conditions in which low speed valve timing should be selected. Thus, according to the method of the invention, failure of the V/T control system is determined based on a value of the correction coefficient $K_{O2}$ calculated with respect to each cylinder.

Figure 3:
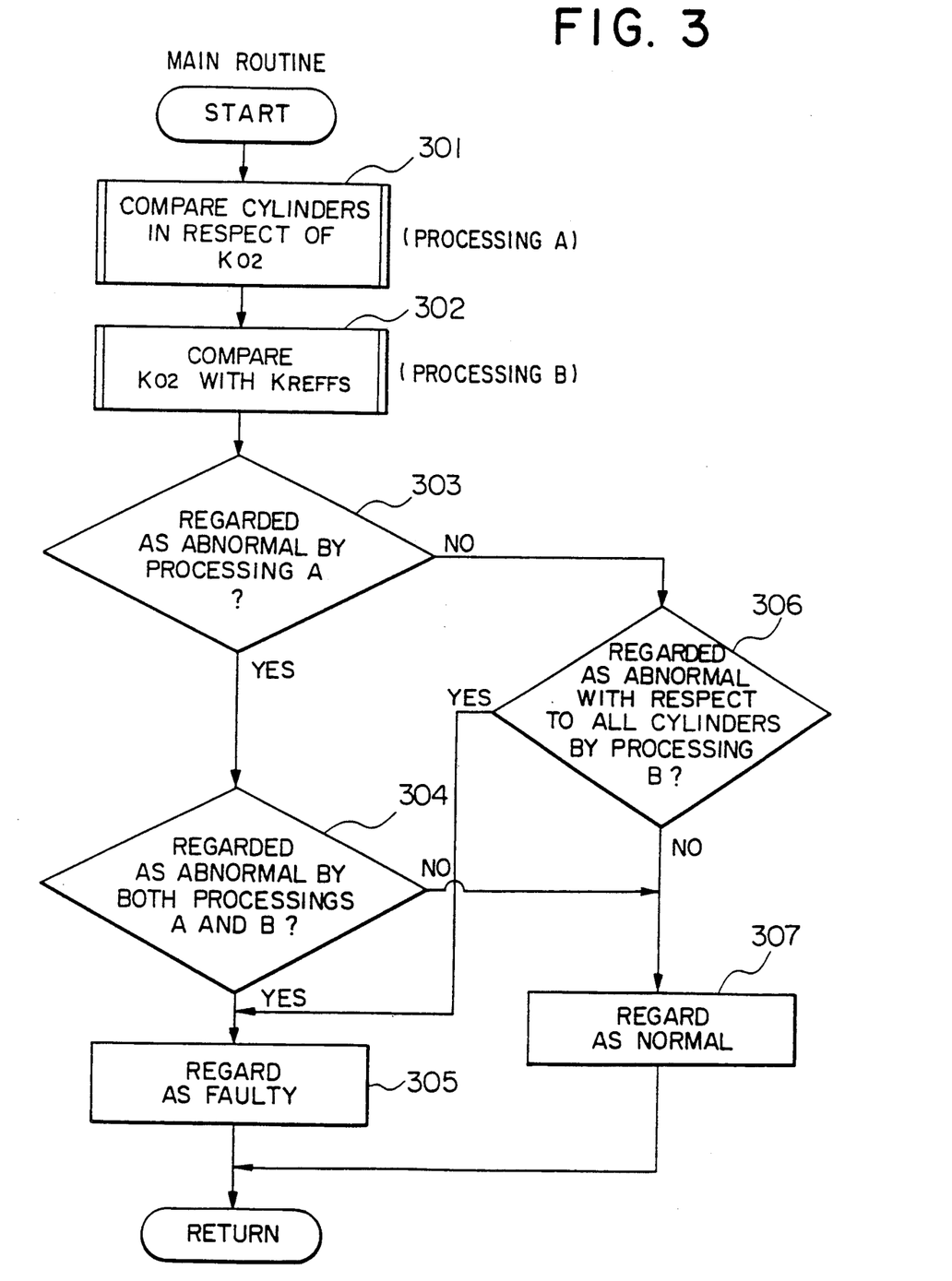
FIG. 3 is a flowchart of a main routine for detecting failure of the valve timing changeover control system.

FIG. 3 shows a program for detecting failure of the V/T control system by utilizing the air-fuel ratio feedback control. This program is executed upon generation of each TDC signal pulse and in synchronism therewith.

First, at a step 301, there is carried out processing (Processing A) of comparing values of the air-fuel ratio feedback control correction coefficient $K_{O2}$ obtained with respect to respective cylinders #1 to #4. Processing A is executed by a subroutine shown in FIG. 4. At a step 401, it is determined whether or not there is failure in any of $O_2$ sensors mounted in the respective branched pipes $13_1$ to $13_4$ of the exhaust manifold. Detection of failure of the $O_2$ sensors is effected, e.g. by determining whether the correction coefficient $K_{O2}$ has continuously assumed a value outside an upper limit or a lower limit of a range of values which can be assumed by a normally functioning $O_2$ sensor, over a predetermined time period.

Figure 4:
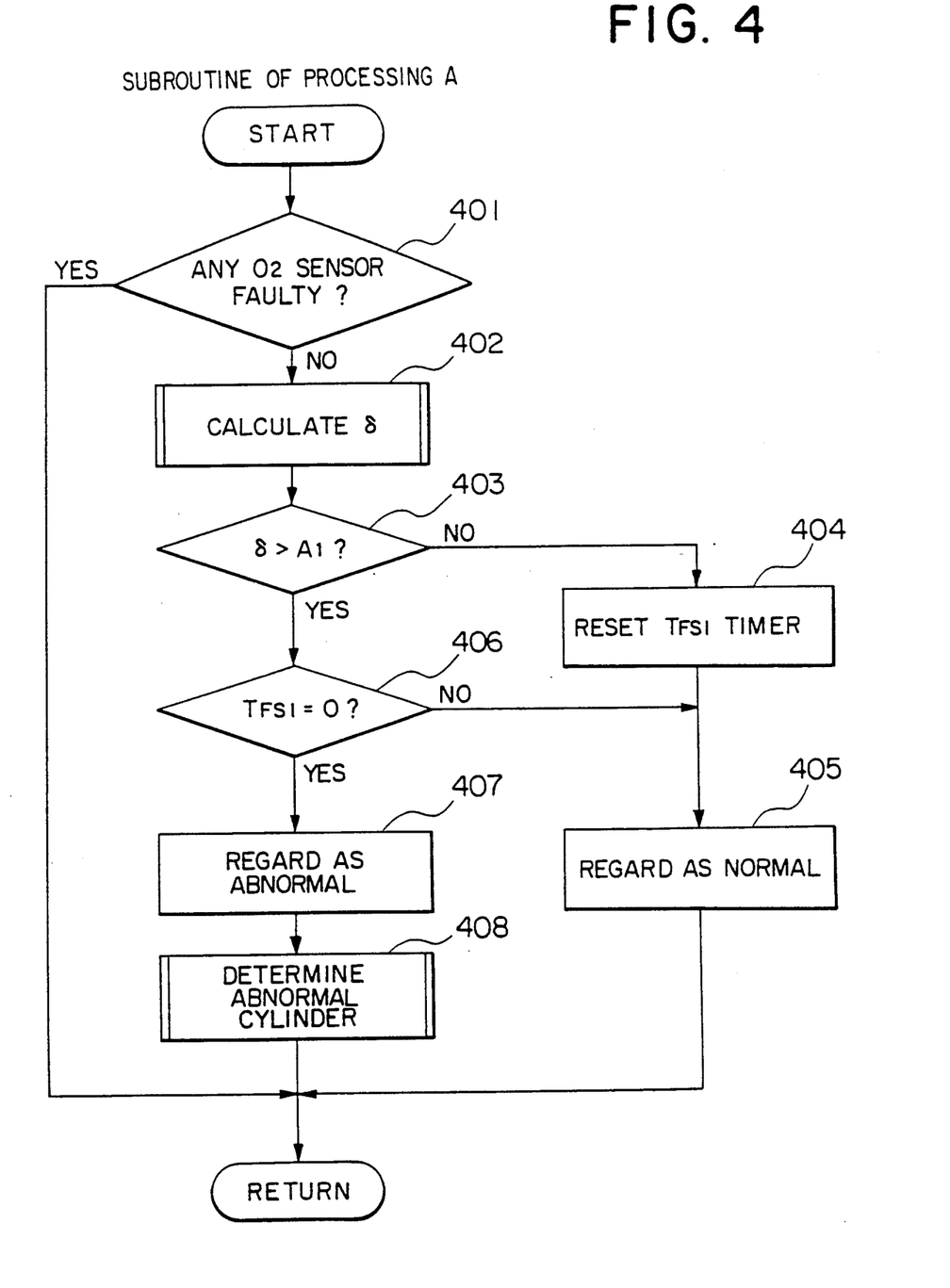
FIG. 4 is a flowchart of a subroutine for comparison between $K_{O2}$ values for cylinders, which is carried out at a step appearing in FIG. 3.

If the answer to the question of the step 401 is affirmative (Yes), i.e. if it is determined that at least one of the $O_2$ sensors $15_1$ to $15_4$ is faulty, the present subroutine is immediately terminated. If the answer is negative (No), i.e. if it is determined that all the $O_2$ sensors $15_1$ to $15_4$ are normally functioning, a reference value is determined based on the values of the correction coefficient $K_{O2}$ of the respective cylinders, and a ration δ of each $K_{O2}$ value to the reference value is calculated as a deviation value of the $K_{O2}$ value of the cylinder (step 402). Preferably, the reference value is an average value of the values of the correction coefficient $K_{O2}$ of the respective cylinders.

Then, at a step 403, it is determined whether or not there is a cylinder with respect to which the deviation value δ calculated at the step 402 exceeds a predetermined value $A_1$ (e.g. 8%).

The predetermined value $A_1$ is determined by taking into consideration differences in fuel injection quantity characteristic between the fuel injection valves 6 and differences in tappet clearance between the inlet and exhaust valves, for instance.

If it is determined at the step 403 that deviation values δ of all the cylinders are equal to or lower than the predetermined value $A_1$, a $T_{FS1}$ downcounter is reset to a predetermined value at a step 404, and the V/T control system is regarded as normal as the result of Processing A at a step 405, followed by terminating the present subroutine.

If it is determined at the step 403 that a deviation value δ of any of the cylinders exceeds the predetermined value $A_1$ and hence it is considered that there is a possibility of failure of a part of the V/T control system corresponding to the cylinder, it is determined at a step 406 whether or not the count value $T_{FS1}$ of the $T_{FS1}$ downcounter is equal to 0.

If the answer to the question of the step 406 is negative (No), i.e. if it is determined that a predetermined time period has not elapsed after the deviation value δ exceeded the predetermined value $A_1$, the program proceeds to the step 405 where the V/T control system is regarded as normal, followed by terminating the present program.

If the answer to the question of the step 406 is affirmative (Yes), i.e. if it is determined that the predetermined time period has elapsed after the deviation δ exceeded the predetermined value $A_1$, it is regarded at a step 407 that there is a possibility of failure of the V/T control system, and then at a step 408, it is determined with respect to which cylinder the failure of the corresponding part of the V/T control system has occurred, followed by terminating the present subroutine.

Referring again to FIG. 3, after execution of Processing A as described above, the program proceeds to a step 302, where there is executed a processing (Processing B) of comparing a value of the correction coefficient $K_{O2}$ obtained with respect to each cylinder with a correction coefficient value $K_{REFFS}$ as a reference value for determining failure of a part of the V/T control system corresponding to the cylinder. The correction coefficient value $K_{REFFS}$ is an average value of values of the correction coefficient $K_{O2}$ obtained during the feedback control with respect to each cylinder. The calculation speed of the coefficient value $K_{REFFS}$ is slower than that of the aforementioned average value $K_{REF}$ of the correction coefficient $K_{O2}$ which is applied to the air-fuel ratio feedback control per se.

As described hereinbefore, at the high speed valve timing, the high speed cam 24 causes the rocker arms 26, 28, 27 to operate in unison. However, if the changeover pin 31 is caught and held in the guide through hole 39, the inlet valves operate at high speed valve timing even when the engine is in an operating condition in which the low speed valve timing should be selected. As a result, the air-fuel ratio is made lean or rich depending on the rotational speed Ne at which the engine then operates. For example, if the valve timing is held at the high speed valve timing due to holding of the connection-changeover mechanism 29 when the engine is in an operating condition in which the low speed valve timing should be selected, the inlet valves 30 close after the piston has passed the bottom dead center (BDC) and at a time point later than at low speed valve timing, and therefore a large amount of intake air once drawn into the combustion chamber in the cylinder is blown back into the intake pipe, so that the amount of intake air actually charged into the combustion chamber deceases. As a result, since the fuel injection amount is then controlled by the ECU 5 to a value suitable for the low speed valve timing, the air fuel ratio is enriched, and accordingly, the correction coefficient $K_{O2}$ rapidly decreases.

Therefore, by providing the correction coefficient value $K_{REFFS}$ and comparing the correction coefficient value $K_{REFFS}$ with the correction coefficient $K_{O2}$, abnormality of a part of the V/T control system corresponding to each cylinder can be detected.

The average value $K_{REF}$ is calculated by the following equation:

$$K_{REF} = K_{O2P} \times (C_{REF}/A) + K_{REF}' \times (A - C_{REF})/A \qquad (2)$$

where $K_{O2P}$ represents a value of $K_{O2}$ obtained immediately before or immediately after execution of the proportional control (P-term control), A an averaging constant, $C_{REF}$ an averaging variable experimentally obtained, which is set to an appropriate value between 1 and A, and $K_{REF}'$ an average value ($K_{REF}$) of values of the coefficient $K_{O2}$ obtained so far through past operation of the engine and stored.

Since the ratio of $K_{O2P}$ to $K_{REF}$ assumed in each execution of the P-term control depends upon the variable $C_{REF}$, it is possible to feely set the degree of precision of calculation of the average value $K_{REF}$ by setting the $C_{REF}$ value at a value between 1 and A that best suits the type of an air-fuel ratio feedback control system, an engine, etc. to be applied.

The correction coefficient value $K_{REFFS}$ is calculated by the following equation (b 3) in which is used an averaging variable $C_{REFFS}$ which is smaller than the value $C_{REF}$ of the above equation (2) (e.g. ½ to ¼ of $C_{REF}$):

$$K_{REFFS} = K_{O2P} \times (C_{REFFS}/A)$$
$$+ K_{REFFS}' \times (A - C_{REFFS})/A \qquad (3)$$

where $K_{REFFS}'$ is an average value ($K_{REFFS}$) of values of the coefficient $K_{O2}$ obtained so far through past operation of the engine and stored.

Figure 5:
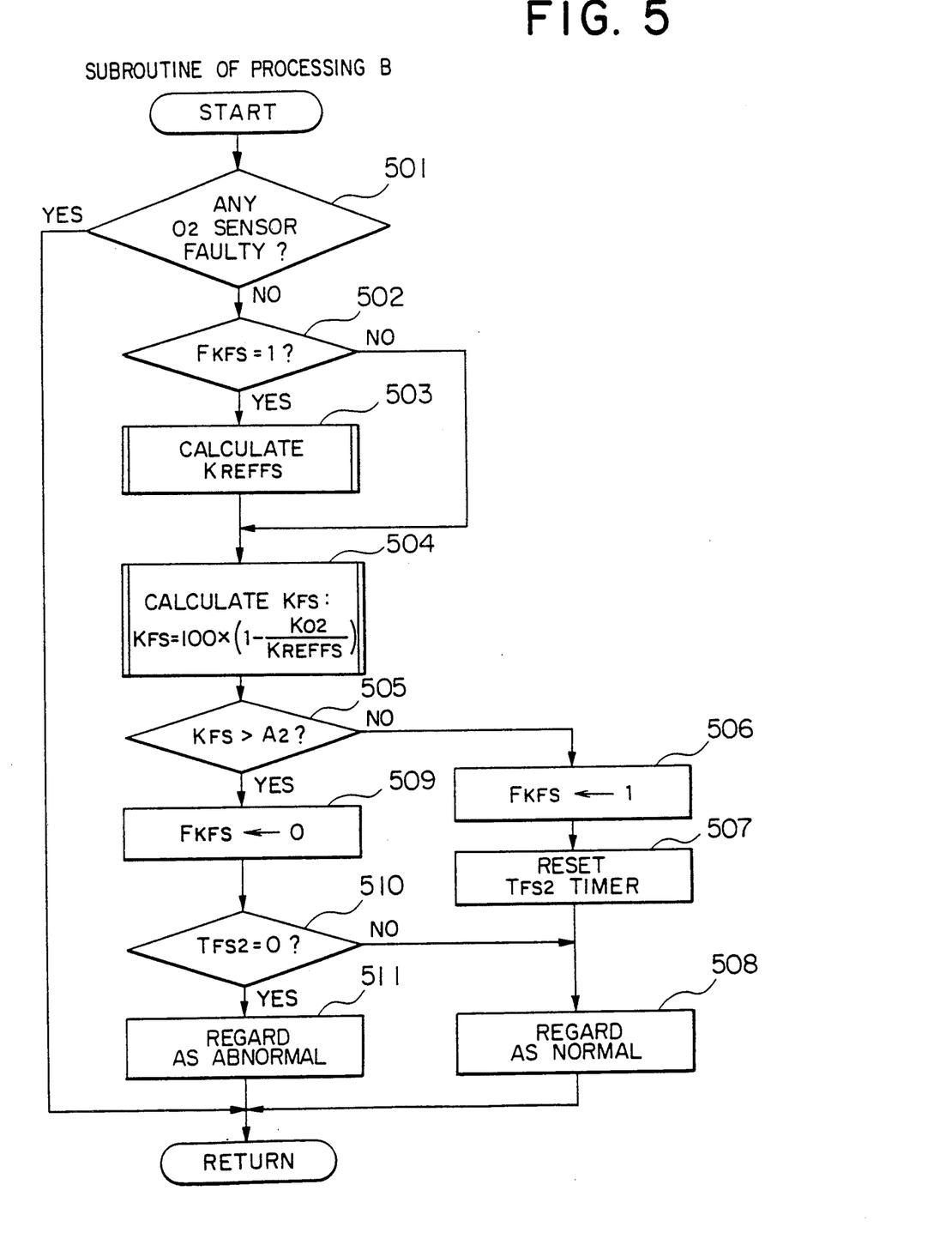
FIG. 5 is a flowchart of a subroutine for comparison of a $K_{O2}$ value with a $K_{REFFS}$ value, which is carried out for each of all the cylinders at a step appearing in FIG. 3.

Processing B (comparison of $K_{O2}$ with $K_{REFFS}$ for each cylinder) is executed by a subroutine shown in FIG. 5.

First, at a step 501, it is determined in a manner similar to the step 401 in FIG. 4 whether there is failure in any of the $O_2$ sensors. If the answer to this question is affirmative (Yes), i.e. if it is determined that at least one $O_2$ sensor is faulty, the present subroutine is immediately terminated.

On the other hand, if it is determined at the step 501 that all the $O_2$ sensors are normally functioning, the program proceeds to a step 502, where it is determined whether a flag $F_{KFS}$ set at a step 506 or a step 509, both referred to hereinafter, is equal to 1. If the answer to this question is affirmative (Yes), the program proceeds to a step 503, where the correction coefficient value $K_{REFFS}$ is calculated by the equation (3), and then the program proceeds to a step 504, whereas if the answer to the question of the step 502 is negative (No), the program jumps to the step 504.

At the step 504, a value $K_{FS}$ for comparing $K_{02}$ with $K_{REFFS}$ is calculated by the following equation:

$$K_{FS} = 100 \times (1 - K_{02}/K_{REFFS}) \qquad (4)$$

At the following step 505, it is determined whether or not the value $K_{FS}$ obtained by the above equation (4) is larger than a predetermined value $A_2$ (e.g. 8%). The predetermined value $A_2$ is set for the same purpose as the predetermined value $A_1$.

If the answer to the question of the step 505 is negative (No), i.e. if it is determined that the value $K_{FS}$ is equal to or lower than the predetermined value $A_2$, the flag $F_{KFB}$ is set to 1 at the step 506, and then a $T_{FS2}$ down counter is set to a predetermined value at a step 507. Then, it is regarded at a step 508 that there is a possibility of normality of the V/T control system, followed by terminating the present subroutine.

On the other hand, if the answer to the question of the step 505 is affirmative (Yes), i.e. if it is determined that the value $K_{FS}$ is larger than the predetermined value $A_2$, the flag $FK_{FS}$ is set to 0 at the step 509, and then the program proceeds to a step 510, where it is determined whether or not the count value of the $T_{FS2}$ down counter is equal to 0. If the answer to the question of the step 510 is negative (No), i.e. if it is determined that a predetermined time period has not elapsed after the value $K_{FS}$ exceeded the predetermined value $A_2$ it is considered at the step 508 that there is a possibility of normality of the V/T control system, followed by terminating the present program.

If the answer to the question of the step 510 is affirmative (Yes), i.e. if it is determined that the predetermined time period has elapsed after the value $K_{FS}$ exceeded the predetermined value $A_2$, it is regarded at a step 511 that the V/T control system is faulty, followed by terminating the present subroutine.

Referring again to FIG. 3, after execution of Processing B at the step 302, the program proceeds to a step 303, where it is determined whether or not the result of Processing A executed at the step 301 indicates abnormality of the V/T control system.

If the answer to the question of the step 303 is affirmative (Yes), i.e. if a value of $K_{02}$ of any of the cylinders is deviated from the average value of the $K_{02}$ values of the respective cylinders by the predetermined value $A_1$ or more, it is determined at a step 304 whether or not a part of the V/T control system corresponding to the cylinder with respect to which the value of $K_{02}$ is deviated as described above has also been determined to be abnormal by Processing B.

If the answer to the question of the step 304 is affirmative (Yes), i.e. if there is at least one cylinder with respect to which the results of both Processing A and Processing B indicate abnormality of the part of the V/T control system corresponding thereto, it is determined at a step 305 that there is failure in the V/T control system, followed by terminating the present program.

On the other hand, if the answer to the question of the step 303 is negative (No), i.e. if with respect to all the cylinders, the respective values of correction coefficient $K_{02}$ are not deviated from the average value by the predetermined value or more, the program proceeds to a step 306, where it is determined whether or not the whole V/T control system for the cylinders was determined to be abnormal by Processing B. This step is carried out since if Processing A is executed when the whole V/T control system for the cylinders is abnormal, the deviation value $\delta$ of each cylinder is likely to be not larger than the predetermined value $A_1$ and hence the cylinders are likely to be regarded as normal as the result of Processing A.

If the answer to the question of the step 306 is affirmative (Yes), i.e. if the results of Processing B indicate that the whole V/T control system for the cylinders is abnormal, it is determined at a step 305 that the whole V/T control system is faulty, followed by terminating the present program.

If the answer to the question of the step 304 is negative (No), i.e. if it is determined that only the results of Processing A indicate abnormality of part of the V/T control system, it cannot be positively decided that there is failure in the V/T control system, and therefore the program proceeds to a step 307, where it is determined that the V/T control system is normal, followed by terminating the present program.

If the answer to the question of the step 306 is negative (No), i.e. not only the results of Processing A but also the results of Processing B indicate that the whole V/T control system for the cylinders is normal, the program proceeds to the step 307, followed by terminating the present program.

Figure 6:
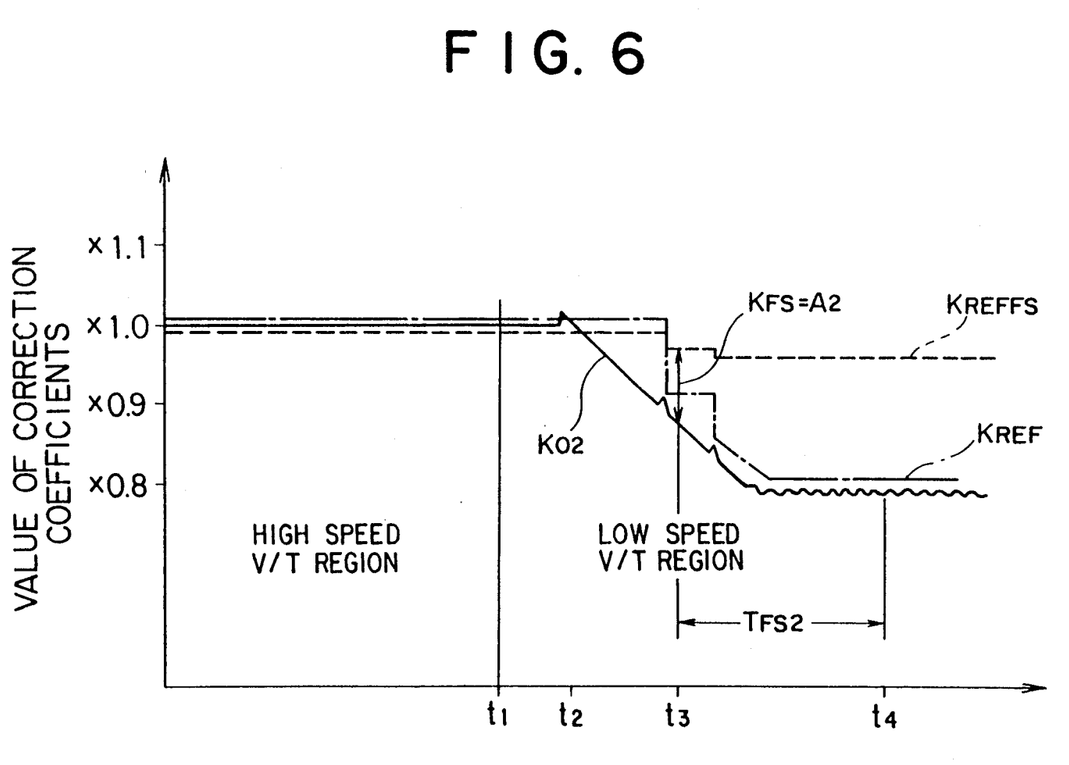
FIG. 6 is a graph showing the relationship between $K_{O2}$, $K_{REFFS}$, and $K_{REF}$ when there is failure in the valve timing changeover control system.

FIG. 6 shows changes in the correction coefficient values $K_{02}$, $K_{REF}$, and $K_{REFFS}$ during the control of the above described embodiment in the event that the air-fuel ratio is enriched due to failure of the V/T control system.

As shown in the figure, if there is failure in the V/T control system when the operating condition of the engine shifts from an operating region in which the high speed valve timing is to be selected to one in which the low speed valve timing is to be selected at a time point $t_1$, the value of $K_{02}$ is rapidly decreased from a time point $t_2$ at which the ECU first detects that the air-fuel ratio has become enriched. Then, at a time point $t_3$, the value $K_{FS}$ exceeds the predetermined value $A_2$, and when this state has continued over the predetermined time period ($t_3$ to $t_4$), it is determined that there is failure in the V/T control system.

Although, in the above described embodiment of the invention, a plurality of $O_2$ sensors are provided in the respective branched pipes of the exhaust manifold leading to the corresponding cylinders, this is not limitative, but a single $O_2$ sensor may be provided in the exhaust pipe at a location downstream of the exhaust manifold to thereby detect abnormality of the V/T control system etc. by carrying out Processing B in FIG. 5 alone.

What is claimed is:

1. A method of detecting failure of a valve timing changeover control system of an internal combustion engine having at least one inlet valve, at least one exhaust valve, an exhaust system, at least one exhaust gas ingredient concentration sensor arranged in said exhaust system for detecting the concentration Of an exhaust gas ingredient, and control means for controlling the air-fuel ratio of an air-fuel mixture supplied to said engine to a desired value in a feedback manner by the use of a coefficient which is varied in response to output from said exhaust gas ingredient concentration sensor, said valve timing changeover control system changing the valve timing of at least one of said at least one inlet valve and said at least one exhaust valve depending on operating conditions of said engine, the method comprising the steps of:
  (1) obtaining a predetermined value of said coefficient based on values of said coefficient obtained during the control of the air-fuel ratio in said feedback manner;
  (2) comparing a present value of said coefficient with said obtained predetermined value; and
  (3) detecting whether there is failure in said valve timing changeover control system, from the result of said comparison.

2. A method according to claim 1, wherein it is determined that there is failure in said valve timing changeover control system when a difference between said present value of said coefficient and said obtained predetermined value is larger than a predetermined value.

3. A method according to claim 1, wherein it is determined that there is failure in said valve timing changeover control system when a difference between said present value and said obtained predetermined value has continued to be larger than a predetermined value over a predetermined time period.

4. A method according to any one of claims 1 to 3, wherein said obtained predetermined value of said coefficient is an average value of said values of said coefficient obtained during the control of the air-fuel ratio in said feedback manner.

5. A method of detecting failure of a valve timing changeover control system of an internal combustion engine having at least one inlet valve, at least one exhaust valve, an exhaust system, at least one exhaust gas ingredient concentration sensor arranged in said exhaust system for detecting the concentration of an exhaust gas ingredient, and control means for controlling the air-fuel ratio of an air-fuel mixture supplied to said engine to a desired value in a feedback manner by the use of a coefficient which is varied in response to output from said exhaust gas ingredient concentration sensor, said valve timing changeover control system changing the valve timing of at least one of said at least one inlet valve and said at least one exhaust valve depending on operating conditions of said engine, a first learned value being calculated based on values of said coefficient obtained during the control of the air-fuel ratio in said feedback manner, said first learned value being used as an initial value of said coefficient when the control of the air-fuel ratio in said feedback manner is started, the method comprising the steps of:
  (1) calculating a second learned value based on values of said coefficient obtained during the control of the air-fuel ratio in said feedback manner at a calculation speed different from a calculation speed used for calculation of said first learned value;
  (2) determining a difference between said calculated second learned value and a present value of said coefficient; and
  (3) detecting whether there is failure in said valve timing changeover control system, from the determined difference.

6. A method according to claim 5, wherein it is determined that there is failure in said valve timing changeover control system when the determined difference between said calculated second learned value and present value of said coefficient is larger than a predetermined value.

7. A method according to claim 5, wherein it is determined that there is failure in said valve timing changeover control system when the determined difference between said calculated second learned value and said present value of said coefficient has continued to be larger than a predetermined value over a predetermined time period.

8. A method according to claim 5, wherein said calculation speed of said second learned value is slower than said calculation speed of said first learned value.

9. A method of detecting failure of a valve timing changeover control system of an internal combustion engine having a plurality of inlet valves, a plurality of exhaust valves, a plurality of cylinders, an exhaust system, a plurality of exhaust gas ingredient concentration sensors arranged in said exhaust system for respective ones of said cylinders for detecting a concentration of an exhaust gas ingredient for each of said cylinders, and control means for controlling the air-fuel ratio of an air-fuel mixture supplied to each of said cylinders to a desired value in a feedback manner by the use of a coefficient which is varied in response to output from each of said exhaust gas ingredient concentration sensors, said valve timing changeover control system changing the valve timing of at least one of said inlet valves and said exhaust valves depending on operating conditions of said engine, the method comprising the steps of:
  (1) determining whether a present value of said coefficient Obtained with respect to said each of said cylinders in response to output from each of said exhaust gas ingredient concentration sensors corresponding to said each of said cylinders is outside a predetermined range of deviation of values of said coefficient from a reference value, said deviation resulting from differences in characteristics between said cylinders; and
  (2) determining that there is failure in a part of said valve timing changeover control system corresponding to said each of said cylinders when said present value of said coefficient is outside said predetermined range of deviation.

10. A method according to claim 9, wherein said reference value is an average value of values of said coefficient obtained with respect to respective ones of said cylinders.

11. A method according to claim 9, wherein it is determined that there is failure in said part of said valve timing changeover control system corresponding to said each cylinder when said present value of said coefficient has continued to be outside said predetermined range of deviation over a predetermined time period.

12. A method of detecting failure of a valve timing changeover control system of an internal combustion engine having a plurality of inlet valves, a plurality of exhaust valves, a plurality of cylinders, an exhaust system, a plurality of exhaust gas ingredient concentration sensors arranged in said exhaust system for respective ones of said cylinders for detecting the concentration of an exhaust gas ingredient for each of said cylinders, and control means for controlling the air-fuel ratio of an air-fuel mixture supplied to each of said cylinders to a desired value in a feedback manner by the use of a coefficient which is varied in response to output from each of said exhaust gas ingredient concentration sensors, said valve timing changeover control system changing the valve timing of at least one of said inlet valves and said exhaust valves depending on operating conditions of said engine, the method comprising the steps of:
  (1) determining whether a present value of said coefficient obtained with respect to each of said cylinders in response to output from each of said exhaust gas ingredient concentration sensors corresponding to said each of said cylinders is outside a predetermined range of deviation of values of said coefficient from a reference value, said deviation resulting from differences in characteristics between said cylinders;

(2) determining that there is a possibility of failure in a part of said valve timing changeover control system corresponding to said each of said cylinders when said present value of said coefficient is outside said predetermined range of deviation;

(3) obtaining a predetermined value based on values of said coefficient obtained with respect to said each of said cylinders during the control of the air-fuel ratio in said feedback manner;

(4) comparing said present value of said coefficient obtained with respect to said each of said cylinders with said obtained predetermined value; and (5) detecting whether there is failure in said part of said valve timing changeover control system from the result of said comparison.

* * * * *